(12) United States Patent
Imani

(10) Patent No.: US 12,204,899 B2
(45) Date of Patent: Jan. 21, 2025

(54) STOCHASTIC HYPERDIMENSIONAL ARITHMETIC COMPUTING

(71) Applicant: The Regents of the University of California, Oakland, CA (US)

(72) Inventor: Mohsen Imani, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 58 days.

(21) Appl. No.: 17/744,371

(22) Filed: May 13, 2022

(65) Prior Publication Data
US 2022/0374234 A1   Nov. 24, 2022

Related U.S. Application Data

(60) Provisional application No. 63/188,199, filed on May 13, 2021.

(51) Int. Cl.
*G06F 9/30* (2018.01)
*G06F 9/355* (2018.01)
*G06F 15/78* (2006.01)

(52) U.S. Cl.
CPC ........ *G06F 9/30036* (2013.01); *G06F 9/3001* (2013.01); *G06F 9/3555* (2013.01); *G06F 15/7821* (2013.01)

(58) Field of Classification Search
CPC . G06F 9/3001; G06F 9/30036; G06F 15/7821
See application file for complete search history.

(56) References Cited

U.S. PATENT DOCUMENTS 11,244,723 B1   2/2022  Karunaratne et al.
11,409,752 B1   8/2022  Qadrud-Din et al.
(Continued)

OTHER PUBLICATIONS

Alaghi, A. et al., "The Promise and Challenge of Stochastic Computing," IEEE Transactions on Computer-Aided Design of Integrated Circuits and Systems, vol. 37, Issue 8, Aug. 2018, IEEE, 19 pages.

(Continued)

*Primary Examiner* — Jacob Petranek
(74) *Attorney, Agent, or Firm* — Withrow & Terranova, P.L.L.C.

(57) ABSTRACT

Stochastic hyperdimensional arithmetic computing is provided. Hyperdimensional computing (HDC) is a neurally-inspired computation model working based on the observation that the human brain operates on high-dimensional representations of data, called hypervectors. Although HDC is powerful in reasoning and association of the abstract information, it is weak on feature extraction from complex data. Consequently, most existing HDC solutions rely on expensive pre-processing algorithms for feature extraction. This disclosure proposes StocHD, a novel end-to-end hyperdimensional system that supports accurate, efficient, and robust learning over raw data. StocHD expands HDC functionality to the computing area by mathematically defining stochastic arithmetic over HDC hypervectors. StocHD enables an entire learning application (including feature extractor) to process using HDC data representation, enabling uniform, efficient, robust, and highly parallel computation. This disclosure further provides a novel fully digital and scalable processing in-memory (PIM) architecture that exploits the HDC memory-centric nature to support extensively parallel computation.

19 Claims, 13 Drawing Sheets

(56) References Cited

U.S. PATENT DOCUMENTS

| | | | |
|---|---|---|---|
| 11,455,161 | B2 | 9/2022 | Prasad et al. |
| 2021/0327376 | A1* | 10/2021 | Srinivasa ............... G06F 18/214 |
| 2022/0121931 | A1 | 4/2022 | Kalarot et al. |
| 2022/0147758 | A1* | 5/2022 | Hiromoto ................ G06N 3/08 |
| 2022/0198782 | A1* | 6/2022 | Zhang .................. G06V 10/774 |

OTHER PUBLICATIONS

Alaghi, A. et al., "Survey of Stochastic Computing," ACM Transactions on Embedded Computing Systems, vol. 12, Issue 2s, Article No. 92, May 2013, 19 pages.

Angelova, A. et al., "Pruning training sets for learning of object categories," 2005 IEEE Computer Society Conference on Computer Vision and Pattern Recognition (CVPR'05), Jun. 20-25, 2005, San Diego, CA, USA, IEEE, 8 pages.

Anguita, D. et al., "Human Activity Recognition on Smartphones Using a Multiclass Hardware-Friendly Support Vector Machine," Proceedings of the 4th International Conference on Ambient Assisted Living and Home Care, Dec. 2012, 8 pages.

Bonomi, F. et al., "Fog computing and its role in the internet of things," MCC '12: Proceedings of the First Edition of the MCC workshop on Mobile Cloud Computing, Aug. 2012, ACM, pp. 13-15.

Ciresan, D. et al., "Multi-column Deep Neural Networks for Image Classification," IEEE Computer Society Conference on Computer Vision and Pattern Recognition, Feb. 2012, 8 pages.

Chen, X.-W. et al., "Big Data Deep Learning: Challenges and Perspectives," IEEE Access, vol. 2, May 2014, IEEE, 12 pages.

Chi, P. et al., "Prime: A Novel Processing-in-Memory Architecture for Neural Network Computation in ReRAM-Based Main Memory," 2016 ACM/IEEE 43rd Annual International Symposium on Computer Architecture (ISCA), Jun. 18-22, 2016, Seoul, South Korea, IEEE, 13 pages.

Dua, D. et al., "UCI Machine Learning Repository," 2019, University of California, School of Information and Computer Science, Irvine, CA, [http://archive.ics.uci.edu/ml], 2 pages.

Hernandez-Cano, A. et al., "OnlineHD: Robust, Efficient, and Single-Pass Online Learning Using Hyperdimensional System," 2021 Design, Automation & Test in Europe Conference & Exhibition, Feb. 1-5, 2021, Grenoble, France, IEEE, 6 pages.

Hou, S. et al., "DualNet: Learn Complementary Features for Image Recognition," 2017 IEEE International Conference on Computer Vision (ICCV), Oct. 22-29, 2017, Venice, Italy, IEEE, 9 pages.

Imani, M. et al., "A Framework for Collaborative Learning in Secure High-Dimensional Space," 2019 IEEE 12th International Conference on Cloud Computing (CLOUD), Jul. 8-13, 2019, Milan, Italy, IEEE, 12 pages.

Imani, M. et al., "DUAL: Acceleration of Clustering Algorithms using Digital-based Processing In-Memory," 2020 53rd Annual IEEE/ACM International Symposium on Microarchitecture (MICRO), Oct. 17-21, 2020, Athens, Greece, IEEE, 16 pages.

Imani, M. et al., "FloatPIM: In-Memory Acceleration of Deep Neural Network Training with High Precision," 2019 ACM/IEEE 46th Annual International Symposium on Computer Architecture (ISCA), Jun. 22-26, 2019, Phoenix, AZ, USA, IEEE, 14 pages.

Mani, M. et al., "Revisiting HyperDimensional Learning for FPGA and Low-Power Architectures," 2021 IEEE International Symposium on High-Performance Computer Architecture (HPCA), Feb. 27-Mar. 3, 2021, Seoul, South Korea, IEEE, 14 pages.

Imani, M. et al., "SearcHD: A Memory-Centric Hyperdimensional Computing With Stochastic Training," IEEE Transactions on Computer-Aided Design of Integrated Circuits and Systems, vol. 39, Issue 10, Oct. 2020, first published Nov. 2019, IEEE, 13 pages.

Jouppi, N. et al., "In-Datacenter Performance Analysis of a Tensor Processing Unit," ISCA '17: Proceedings of the 14th Annual International Symposium on Computer Architecture, Jun. 2017, ACM, 12 pages.

Kanerva, P., "Hyperdimensional Computing: An Introduction to Computing in Distributed Representation with High-Dimensional Random Vectors," Cognitive Computation, vol. 1, No. 2, Jan. 2009, Springer Science +Business Media, LLC, 21 pages.

Kim, K. et al., "Dynamic energy-accuracy trade-off using stochastic computing in deep neural networks," 2016 53nd ACM/EDAC/IEEE Design Automation Conference (DAC), Jun. 5-9, 2016, Austin, TX, USA, IEEE, 6 pages.

Kotra, J. et al., "Re-NUCA: A Practical NUCA Architecture for ReRAM Based Last-Level Caches," 2016 IEEE International Parallel and Distributed Processing Symposium (IPDPS), May 23-27, 2016, Chicago, IL, USA, IEEE, 10 pages.

Kvatinsky, S. et al., "MAGIC—Memristor-Aided Logic," IEEE Transactions on Circuits and Systems—II: Express Briefs, vol. 61, No. 11, Nov. 2014, IEEE, pp. 895-899, 5 pages.

Kvatinsky, S. et al., "VTEAM: A General Model for Voltage-Controlled Memristors," IEEE Transactions on Circuits and Systems II: Express Briefs, vol. 62, Issue 8, Aug. 2015, first published May 2015, IEEE, 5 pages.

Lecun, Y. et al., "Gradient-based learning applied to document recognition," Proceedings of the IEEE, vol. 86, No. 11, Nov. 1998, IEEE, 46 pages.

Li, H. et al., "Hyperdimensional computing with 3D VRRAM in-memory kernels: Device-architecture co-design for energy-efficient, error-resilient language recognition," 2016 IEEE International Electron Devices Meeting (IEDM), Dec. 3-7, 2016, San Francisco, CA, USA, IEEE, 4 pages.

Liu, S. et al., "Energy efficient stochastic computing with Sobol sequences," Design, Automation & Test in Europe Conference & Exhibition (Date), Mar. 27-31, 2017, Lausanne, Switzerland, IEEE, 4 pages.

Mitrokhin, A. et al., "Learning sensorimotor control with neuromorphic sensors: Toward hyperdimensional active perception," Science Robotics, vol. 4, No. 30, May 2019, 11 pages.

Nazemi, M. et al., "SynergicLearning: Neural Network-Based Feature Extraction for Highly-Accurate Hyperdimensional Learning," arXiv:2007.15222v2 [cs.LG], Aug. 4, 2020, 9 pages.

Paszke, A. et al., "PyTorch: An Imperative Style, High-Performance Deep Learning Library," NIPS'19: Proceedings of the 33rd International Conference on Neural Information Processing Systems, Article No. 721, Dec. 2019, 12 pages.

Rahimi, A. et al., "A Robust and Energy-Efficient Classifier Using Brain-Inspired Hyperdimensional Computing," ISLPED '16: Proceedings of the 2016 International Symposium on Low Power Electronics and Design, Aug. 2016, 6 pages.

Reiss, A. et al., "Introducing a New Benchmarked Dataset for Activity Monitoring," 2012 16th International Symposium on Wearable Computers, Jun. 18-22, 2012, Newcastle, UK, IEEE, 2 pages.

Shafiee, A. et al., "ISAAC: A Convolutional Neural Network Accelerator with In-Situ Analog Arithmetic in Crossbars," 2016 ACM/IEEE 43rd Annual International Symposium on Computer Architecture (ISCA), Jun. 18-22, 2016, Seoul, South Korea, IEEE.

Synopsys, "A New World of Innovation," https://www.synopsys.com, available as early as 2021, 9 pages.

Wu, T.F. et al., "Brain-inspired computing exploiting carbon nanotube FETs and resistive RAM: Hyperdimensional computing case study," 2018 IEEE International Solid—State Circuits Conference—(ISSCC), Feb. 11-15, 2018, San Francisco, CA, USA, IEEE, 3 pages.

Imani, M. et al., "A Binary Learning Framework for Hyperdimensional Computing," 2019 Design, Automation & Test in Europe Conference & Exhibition (Date), Mar. 25-29, 2019, Florence, Italy, IEEE, 6 pages.

Imani, M. et al., "BRIC: Locality-based Encoding for Energy-Efficient Brain-Inspired Hyperdimensional Computing," 2019 56th ACM/IEEE Design Automation Conference (DAC), Jun. 2-6, 2019, Las Vegas, NV, USA, IEEE, 6 pages.

Imani, M. et al., "Exploring Hyperdimensional Associative Memory," 2017 IEEE International Symposium on High Performance Computer Architecture (HPCA), Feb. 4-8, 2017, Austin, TX, IEEE, 12 pages.

(56) References Cited

OTHER PUBLICATIONS

Imani, M. et al., "Hierarchical Hyperdimensional Computing for Energy Efficient Classification," 2018 55th ACM/ESDA/IEEE Design Automation Conference (DAC), Jun. 24-28, 2018, San Francisco, CA, USA, IEEE, 6 pages.
Kim, Y. et al., "Efficient Human Activity Recognition Using Hyperdimensional Computing," IOT '18: Proceedings of the 8th International Conference on the Internet of Things, Article No. 38, Oct. 2018, 6 pages.
Notice of Allowance for U.S. Appl. No. 17/895,177, mailed Feb. 28, 2024, 8 pages.
Non-Final Office Action for U.S. Appl. No. 17/895,177, mailed Nov. 15, 2023, 9 pages.

* cited by examiner

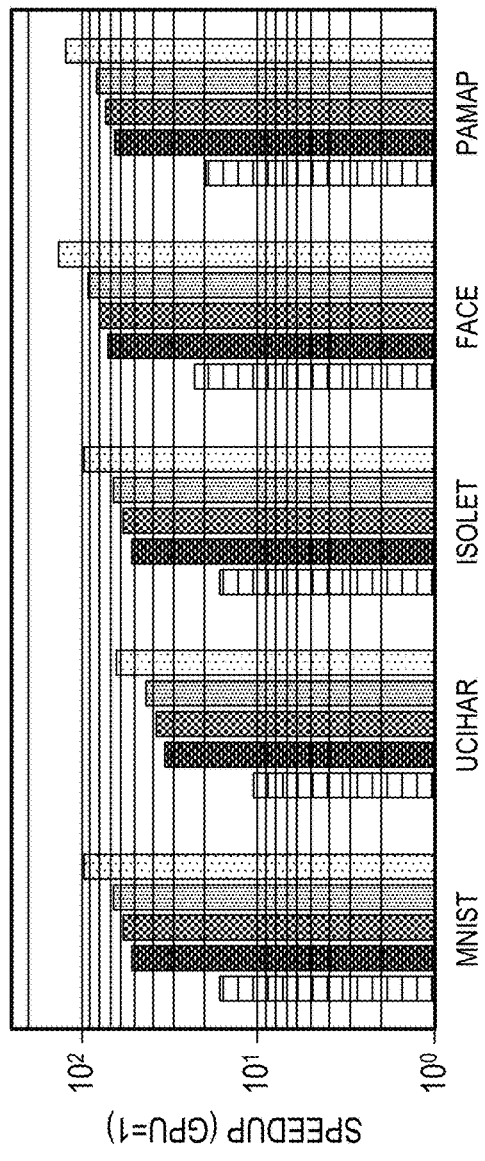
FIG. 10A
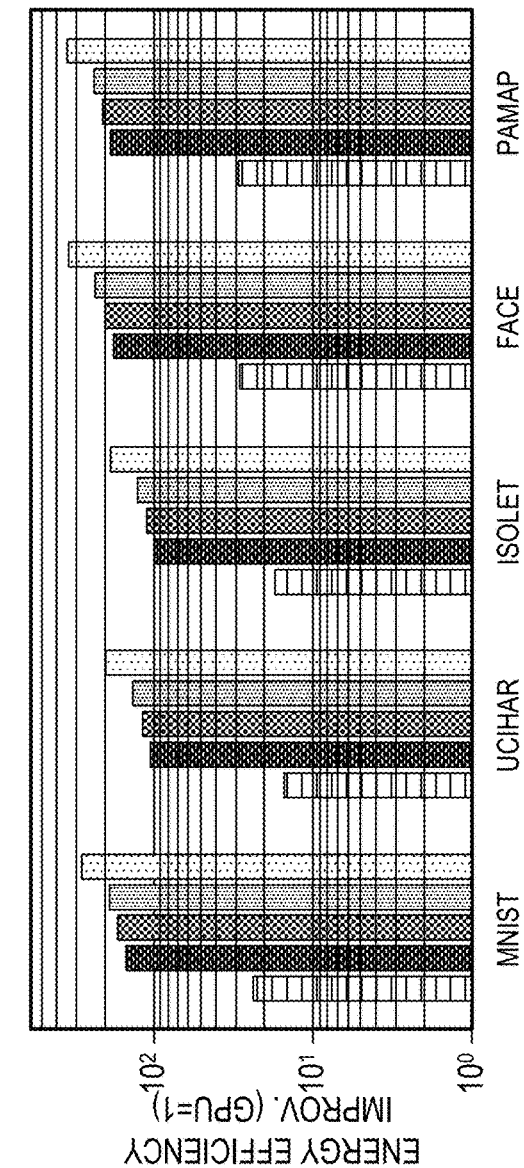
FIG. 10B
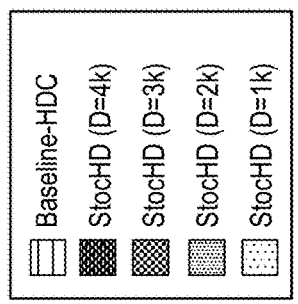

STOCHASTIC HYPERDIMENSIONAL ARITHMETIC COMPUTING

RELATED APPLICATIONS

This application claims the benefit of provisional patent application serial number 63/188,199, filed May 13, 2021, the disclosure of which is hereby incorporated herein by reference in its entirety.

GOVERNMENT SUPPORT

This invention was made with government funds under grant number N00014-21-1-2225 awarded by the Department of the Navy, Office of Naval Research. The U.S. Government may have rights in this invention.

FIELD OF THE DISCLOSURE

The present disclosure relates to processing-in-memory (PIM) architectures and hyperdimensional computing (HDC).

BACKGROUND

There is an increasing need for efficient processing for diverse cognitive tasks using a vast volume of data generated. However, running machine learning algorithms often results in extremely slow processing speed and high energy consumption on traditional systems or needs a large cluster of application-specific integrated chips (ASICs), such as deep learning on Google tensor processing unit (TPU). There are two key technical challenges that make it difficult to learn in today's computing devices: computation efficiency and robustness to noise.

Hyperdimensional computing (HDC) has been introduced as a computational model towards high-efficiency and noise-tolerant computation. HDC is motivated by the observation that the human brain operates on high-dimensional data representations. In HDC, objects are thereby encoded with high-dimensional vectors, called hypervectors, which have thousands of elements. This mimics several important functionalities of the human memory model with vector operations, which are computationally tractable and mathematically rigorous in describing human cognition.

Although HDC is quite powerful in reasoning and association of the abstract information, it is weak on feature extraction from complex data, such as image and video data. This forces HDC algorithms to rely on a pre-processing step to extract useful information from raw data.

FIG. 1 is a schematic diagram of an existing HDC learning solution operating over pre-processed data. For an example of image data, existing HDC solutions rely on signals extracted from popular feature extractor algorithms, such as convolution and histogram of gradient (HOG). These pre-processing algorithms are not compatible with the HDC learning model, and therefore need to be processed over traditional data representation. The existing HDC primitives are abstract and approximate, and accordingly cannot support a high precision arithmetic.

SUMMARY

Stochastic hyperdimensional arithmetic computing is provided. Hyperdimensional computing (HDC) is a neurally-inspired computation model working based on the observation that the human brain operates on high-dimensional representations of data, called hypervectors. Although HDC is powerful in reasoning and association of the abstract information, it is weak on feature extraction from complex data such as image and video data. As a result, most existing HDC solutions rely on expensive pre-processing algorithms for feature extraction.

This disclosure proposes StocHD, a novel end-to-end hyperdimensional system that supports accurate, efficient, and robust learning over raw data. Unlike prior work that used HDC for learning tasks, StocHD expands HDC functionality to the computing area by mathematically defining stochastic arithmetic over HDC hypervectors. StocHD enables an entire learning application (including feature extractor) to process using HDC data representation, enabling uniform, efficient, robust, and highly parallel computation.

This disclosure further provides a novel fully digital and scalable processing in-memory (PIM) architecture that exploits the HDC memory-centric nature to support extensively parallel computation. An evaluation over a wide range of classification tasks shows that StocHD provides, on average, 3.3× and 6.4× (52.3× and 143.5×) faster and higher energy efficiency as compared to state-of-the-art HDC algorithm running on PIM (NVIDIA GPU), while providing 16× higher computational robustness.

An exemplary embodiment provides a method for efficient and robust computation. The method includes converting stored data into hyperdimensional data and performing hyperdimensional computation over the hyperdimensional data using hyperdimensional arithmetic operations.

Another exemplary embodiment provides a processing-in-memory (PIM) architecture. The PIM architecture includes a memory array configured to store a set of hypervectors, a compute block coupled to the memory array and configured to perform hyperdimensional arithmetic operations on the set of hypervectors, and a search block coupled to the memory array and configured to perform search operations on the set of hypervectors.

Another exemplary embodiment provides a stochastic hyperdimensional system. The stochastic hyperdimensional system includes a PIM accelerator and a system memory storing instructions. When executed, the instructions cause the PIM accelerator to convert data stored in memory into a set of hypervectors stored in the PIM accelerator and perform hyperdimensional computation over the set of hypervectors using hyperdimensional arithmetic operations.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 10A is a graphical representation of speedup of the stochastic hyperdimensional system.

FIG. 10B is a graphical representation of energy efficiency of the stochastic hyperdimensional system.

DETAILED DESCRIPTION

Figure 1:
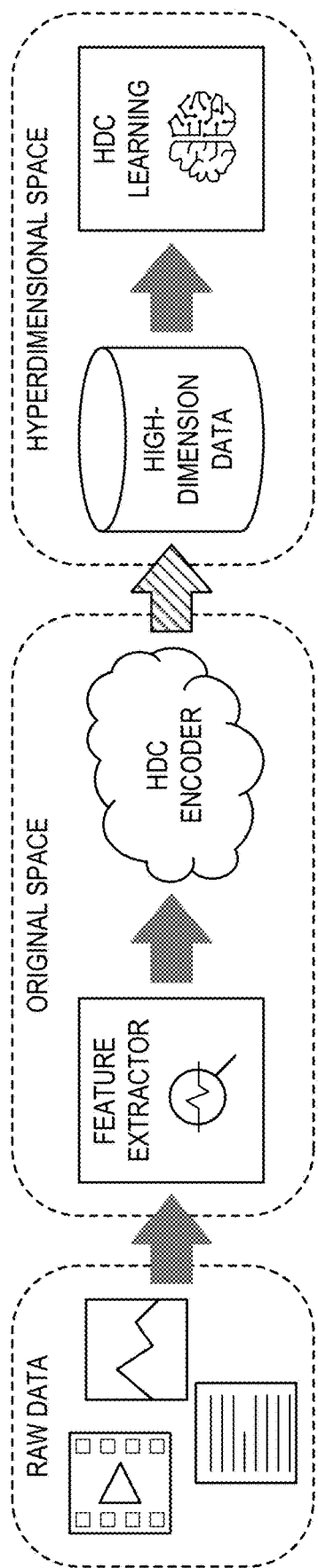
FIG. 1 illustrates an existing hyperdimensional computing (HDC) learning solution operating over pre-processed data.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Stochastic hyperdimensional arithmetic computing is provided. Hyperdimensional computing (HDC) is a neurally-inspired computation model working based on the observation that the human brain operates on high-dimensional representations of data, called hypervectors. Although HDC is powerful in reasoning and association of the abstract information, it is weak on feature extraction from complex data such as image and video data. As a result, most existing HDC solutions rely on expensive pre-processing algorithms for feature extraction.

This disclosure proposes StocHD, a novel end-to-end hyperdimensional system that supports accurate, efficient, and robust learning over raw data. Unlike prior work that used HDC for learning tasks, StocHD expands HDC functionality to the computing area by mathematically defining stochastic arithmetic over HDC hypervectors. StocHD enables an entire learning application (including feature extractor) to process using HDC data representation, enabling uniform, efficient, robust, and highly parallel computation. This disclosure further provides a novel fully digital and scalable processing in-memory (PIM) architecture that exploits the HDC memory-centric nature to support extensively parallel computation.

I. Introduction

With reference to FIG. 1, running pre-processing algorithms on traditional data representation provides the following challenges: (i) significant computation cost that dominates the entire learning efficiency, (ii) non-uniform data processing as feature extractors require different hardware optimizations, precision, and data representation, (iii) a low computational robustness coming from non-holographic data representation, making the entire system vulnerable to error, and (iv) the necessity of using expensive data encoding to map extracted features into high-dimensional space.

To address these issues, this disclosure proposes StocHD, a novel end-to-end hyperdimensional learning system operating accurate, efficient, and robust learning over raw generated data. The main contributions are listed below:

- This is the first effort that fundamentally defines stochastic arithmetic over hyperdimensional vectors, enabling highly accurate, efficient, and robust computation. Unlike all prior methods that rely on the expensive pre-processing step, StocHD enables an entire learning application (including feature extractor) to process using HDC data representation, enabling uniform, efficient, robust, and parallel computation.
- The solution mathematically defines stochastic arithmetic over HDC vectors, including weighted addition, subtraction, multiplication, division, and comparisons. This arithmetic is exploited to revisit the pre-processing algorithms to run using uniform HDC data representation without paying the cost of decoding data back to the original space.
- A novel processing in-memory architecture is proposed that exploits inherent parallelism and the memory-centric nature of HDC. The proposed PIM architecture exploits the switching characteristics of non-volatile memory to support tensor-based computation over hypervectors internally in memory.

The efficiency of StocHD is evaluated over a wide range of learning algorithms. This evaluation shows that StocHD provides, on average, 3.3× and 6.4× (52.3× and 143.5×) faster and higher energy efficiency as compared to state-of-the-art HDC algorithm running on PIM (NVIDIA GTX 1080 GPU). In addition, as compared to state-of-the-art HDC solutions, StocHD provides 16× higher robustness to possible noise.

II. StocHD Framework Overview

Figure 2:
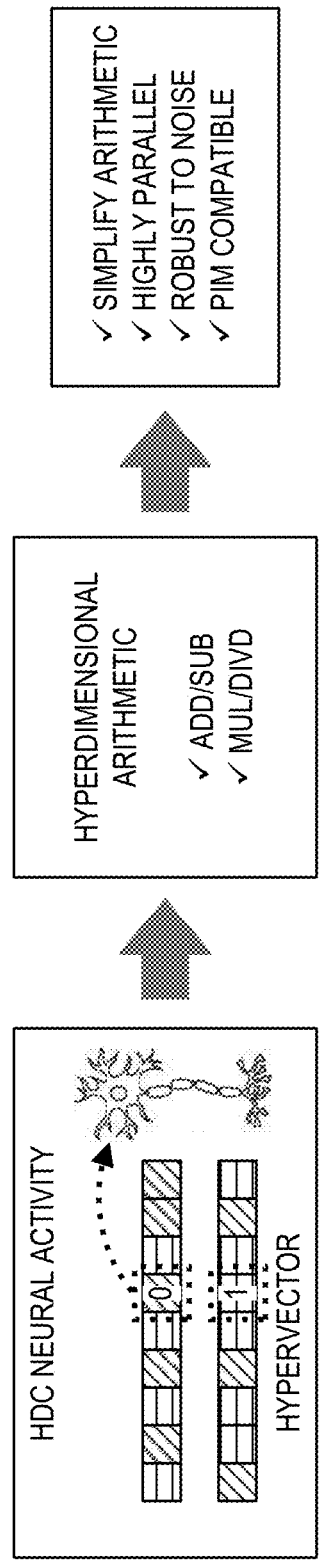
FIG. 2 illustrates expansion of HDC functionality using stochastic arithmetic operations according to embodiments described herein.

FIG. 2 illustrates expansion of HDC functionality using stochastic arithmetic operations according to embodiments described herein. The solution proposed herein (referred to as StocHD) expands HDC functionality to the computing area, defining stochastic arithmetic operations over HDC vectors. This framework translates all data points to hyperdimensional space, enabling both feature extraction and learning to be performed using uniform data representation. For example, convolution or histogram of gradient (HOG) are commonly used feature extractors for image data. StocHD exploits HDC arithmetic to revisit the feature extractor algorithm to high-dimensional space.

Figure 3A:
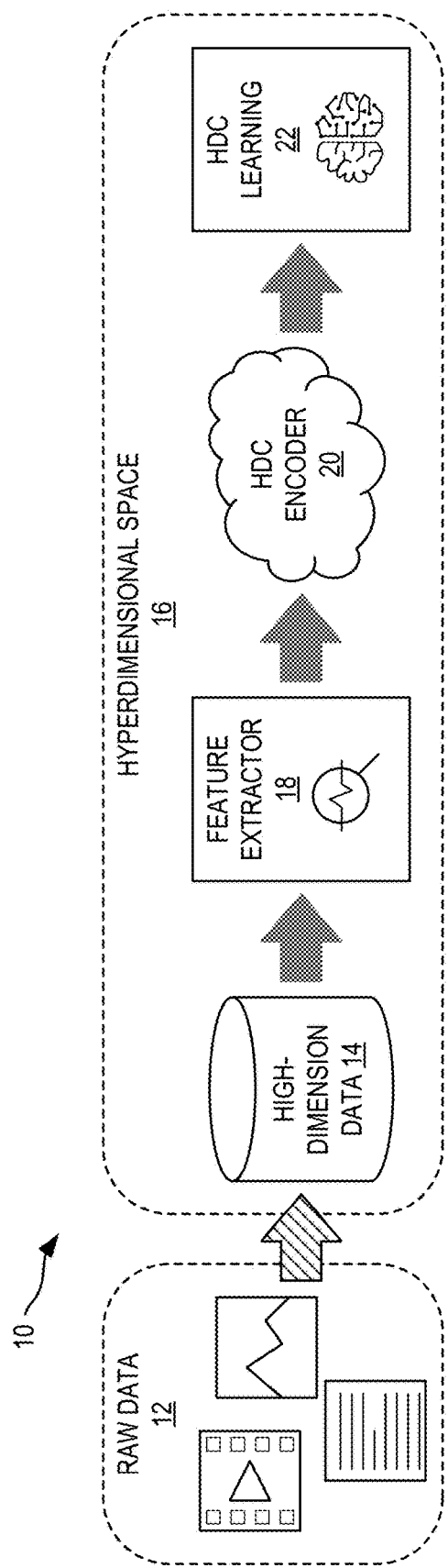
FIG. 3A is a block schematic diagram of a StocHD framework for hyperdimensional computation from raw data.

FIG. 3A is a block schematic diagram of the StocHD framework 10 for hyperdimensional computation from raw data. The StocHD framework 10 provides: (1) an end-to-end learning solution that enables fully HDC learning over raw data, (2) high computational robustness, as the entire application (including feature extractor) can benefit from the holographic data representation, and (3) significant efficiency as HDC revisits the complex feature extraction with parallel bitwise operations.

The StocHD framework 10 receives raw data 12, such as via signals or data stored in system memory. The raw data 12 is represented as high-dimension data 14 in hyperdimensional space 16, as further explained in Section III. Thereafter, computations are performed on the high-dimension data 14 in hyperdimensional space 16, such as with a feature extractor 18, an HDC encoder 20, and in HDC learning 22.

HDC has a memory-centric architecture with primitives hardware-friendly operations and extensive parallelism. These features make HDC idea for in-memory acceleration. Embodiments described herein further provide a novel processing in-memory platform that supports all StocHD operations directly over digital data stored in memory. This eliminates the data movement issue between memory and computing unit, which dominates the entire StocHD energy.

Figure 3B:
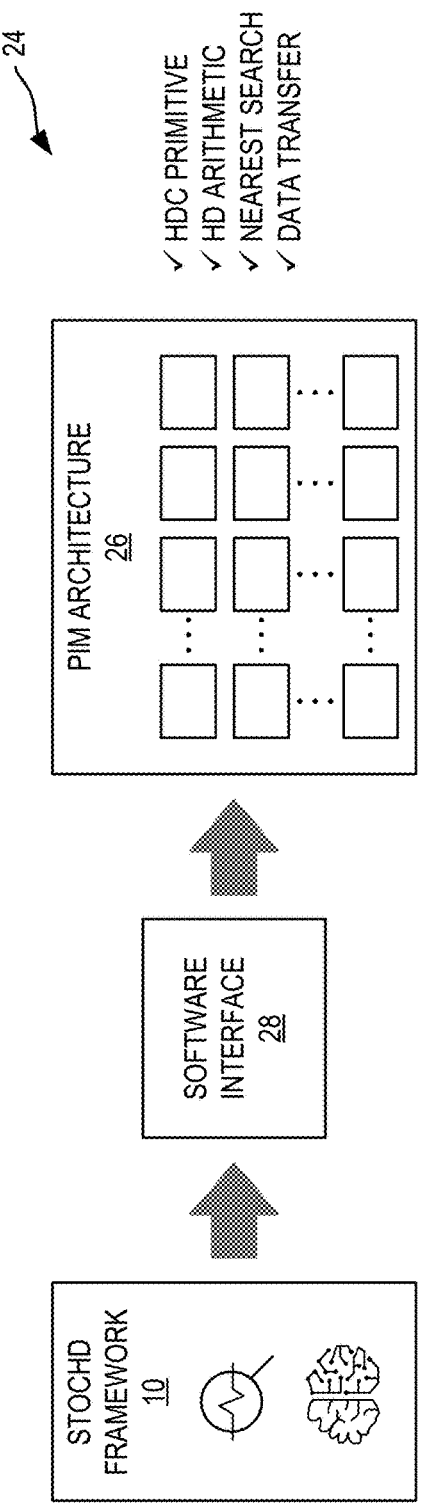
FIG. 3B is a block schematic diagram of a stochastic hyperdimensional system implementing the StocHD framework of FIG. 3A on a processing-in-memory (PIM) architecture.

FIG. 3B is a block schematic diagram of a stochastic hyperdimensional system 24 implementing the StocHD framework 10 of FIG. 3A on a PIM architecture 26. Using a software interface 28, the StocHD framework 10 can be accelerated on the PIM architecture 26, from feature extraction to the learning process, as further described in Section IV.

III. StocHD Stochastic Primitives

A. HDC Supported Operations

HDC encoding works based on a set of defined primitives. The goal is to exploit the same primitives to define stochastic computing-based arithmetic operations over HDC vectors. HDC is an algebraic structure; it uses search along with several key operations (and their inverses): Bundling (+) that acts as memorization during hypervector addition, Binding (*) that associates multiple hypervectors, and Permutation (ρ) which preserves the position by performing a single rotational shift. In HDC, the hypervectors are compositional—they enable computation in superposition, unlike standard neural representations. These HDC operations facilitate reasoning about and searching through input data that satisfy prespecified constraints. To support arithmetic operation, StocHD requires the following HDC operations.

1. HDC Hypervector Generation

A random hypervector is generated with elements ±1 such that +1 appears with probability p. This facilitates constructing HDC representations of arbitrary numbers via a D dimensional vector. In the stochastic hyperdimensional system 24, information is stored with components ±1. A random HDC vector $\vec{V}_1$ is fixed to be a basis vector. A random HDC vector $\vec{V}_h(h \in [-1,1])$ is said to represent the number h if δ $(\vec{V}_h, \vec{V}_1)=h$. This is consistent with the notation for $\vec{V}_1$ which means that $\vec{V}_1$ represents the number 1. Note that based on this representation, $\vec{V}_{-a}=-\vec{V}_a$.

2. Probabilistic Merging

Given n numbers $\{a_1, a_2, \ldots, a_n\}$ and their corresponding probability values, $\{p_1, p_2, p_{n-1}\} \in [0,1]$, where $p_n$ is defined by $\Sigma_{i=1}^n p_i=1$, the probabilistic merging chooses the number $a_i$ with probability $p_i$. This operation can be extended to operate n hypervectors, where each dimension of merged hypervector is selected by probabilistic merging of n elements located in the same dimension of given input hypervectors.

3. Similarity Measurement

Between two HD vectors $\vec{V}_1$ and $\vec{V}_2$, the similarity defines as $$\delta(\vec{V}_1, \vec{V}_2) = \frac{\vec{V}_1 \cdot \vec{V}_2}{D}$$

where D is the number of dimensions and (·) is the vector dot product operator. HDC supports other similarity metrics, such as Hamming similarity, that measures the number of dimensions at which two HDC vectors differ.

B. HDC Arithmetic Operations

1. Weighted Average

StocHD defines weighted accumulation over hypervectors. Given two random HDC vectors $\vec{V}_a$ and $\vec{V}_b$ and two probability numbers $\{p, q\} \in [0,1](p+q=1)$, define $C = p\vec{V}_a \oplus q\vec{V}_b$ to be the random HDC vector whose i-th component is $\vec{V}_a^i$ or $\vec{V}_b^i$ with probability p and q, respectively. This can be extended to probabilistic merging of n HDC vectors $\vec{V}_1, \vec{V}_2, \ldots, \vec{V}_n$ and n−1 probabilities $p_1, p_2, \ldots, p_{n-1}$ ($p_n$ is defined by $\Sigma_{i=1}^n p_i = 1$). Similarly, the weighted sum can be defined as $p_1 \vec{V}_1 \oplus p_2 \vec{V}_2 \oplus \ldots \oplus p_n \vec{V}_n$.

Consider $\vec{V}_c = 0.5 \vec{V}_a \oplus 0.5 \vec{V}_b$. To verify the correct functionality of StocHD, it must be shown that $$c = \frac{a+b}{2}.$$

Based on this definition, $\vec{V}_a$ has similarity a with $\vec{V}_1$. As a result it has exactly $$\frac{a+1}{2}$$

parts components common with $\vec{V}_1$. So if a dimension i is randomly chosen, the probability that the i-th component of both $\vec{V}_a$ and $\vec{V}_1$ match is given by $$\frac{1+a}{2}.$$

Considering the i-tn component of $\vec{V}_c$, the probability that the i-th component is taken from $\vec{V}_a$ and $\vec{V}_b$ is 0.5 and 0.5, respectively. Thus, the probability that the i-th component of $\vec{V}_c$ matches with $\vec{V}_1$ is given by $$\frac{1}{2}\frac{1+a}{2} + \frac{1}{2}\frac{1+b}{2} = \frac{1+\frac{a+b}{2}}{2}.$$

As a result, $$\delta(\vec{V}_c, \vec{V}_1) = \frac{a+b}{2}$$

which is what was claimed. Similarly, StocHD supports weighted subtraction given by $$0.5\vec{V}_a \oplus 0.5\vec{V}_{-b} = \vec{V}_{\frac{a-b}{2}}.$$

2. Constructing Representations

Define $$\vec{V}_a = \frac{a+1}{2}\vec{V}_1 \oplus \frac{1-a}{2}(-\vec{V}_1).$$

Note that $\vec{V}_a$ will have $$\frac{1+a}{2}$$

components same with $\vec{V}_1$ and $$\frac{1-a}{2}$$

component same with $-\vec{V}_1$ (which has components complementary to $\vec{V}_1$). As a result, $\delta(\vec{V}_a, \vec{V}_1) = a$ and thus a representation of the number a given by $$\vec{V}_a = \frac{a+1}{2}\vec{V}_1 \oplus \frac{1-a}{2}(\vec{V}_{-1})$$

has been constructed. Note that if $a \in [0,1]$, then this is equivalent to $$\frac{1+a}{2} \in [0, 1]$$

and so the probibilities for merging are well defined. This operation will be the building blocks of all other arithmetic operations.

3. Multiplication

Given two HDC representations $\vec{V}_a$ and $\vec{V}_b$, an HDC vector $\vec{V}_{ab}$ can be constructed. Consider the i-th dimension of $\vec{V}_c$ and set it to the i-th dimension of $\vec{V}_1$ if the i-th dimension of $\vec{V}_a$ and $\vec{V}_b$ are both +1 or both −1. Otherwise set the i-th dimension of $\vec{V}_c$ to be the i-th dimension of $\vec{V}_{-1}$. From this construction, the probability that the i-th dimension of $\vec{V}_c$ is the same as $\vec{V}_1$ is given by $$\frac{ab+1}{2}.$$

Thus, $$\delta(\vec{V}_c, \vec{V}_1) = 2\frac{ab+1}{2} - 1 = ab$$

and so $\vec{V}_c \equiv \vec{V}_{ab}$. In a simpler form, $\vec{V}_{ab}$ can be computed by element-wise product of $\vec{V}_a$, $V_b$, and $\vec{V}_1$ hypervectors.

4. Comparisons

Comparison is another key operation for data processing as well as required operation to implement division. Suppose hypervectors $\vec{V}_a$ and $\vec{V}_b$ are given, corresponding to a and b values in original space. One can check comparison by first calculating $$\vec{V}_{\frac{a-b}{2}} = \vec{V}_a \oplus \vec{V}_{-b}.$$

Then the value is evaluated using $$\frac{a-b}{2} \sim \delta\left(\vec{V}_{\frac{a-b}{2}}, \vec{V}_1\right).$$

Finally, one can check whether $$\frac{a-b}{2}$$

is positive, negative or 0.

5. Division

Consider two vectors $\vec{V}_a$ and $\vec{V}_b$. The aim is to construct an HDC vector $\vec{V}_{a/b}$, which would be saturated if a/b lies outside the range of the HDC arithmetic system. Without loss of generality, assume a and b are both positive. Then, the following steps are performed:

Initialize two vectors $\vec{V}_{low}$ to be $\vec{V}_{-1}$ and $\vec{V}_{high}$ to be $\vec{V}_1$ Calculate $\vec{V}_{mid} = 0.5 \vec{V}_{low} \oplus 0.5 \vec{V}_{high}$ and $\vec{V}_{midb} = \vec{V}_{mid} \oplus \vec{V}_b$, where $\oplus$ is used to stand for multiplication If $\vec{V}_{midb} > \vec{V}_a$, then do $\vec{V}_{high} \rightarrow \vec{V}_{midb}$ If $\vec{V}_{midb} < \vec{V}_a$, then do $\vec{V}_{low} \rightarrow \vec{V}_{midb}$ Repeat from step 2 until $\vec{V}_{midb} = \vec{V}_a$ or $\vec{V}_c = \vec{V}_{+1}$, then stop.

This process eventually has to end because the difference between the evaluation of $\vec{V}_{low}$ and $\vec{V}_{high}$ keeps decreasing at each iteration. This yields a representation of a/b which is $\vec{V}_{mid}$.

6. Doubling

Similar to how division is defined, a doubling formula can also be defined to construct $\vec{V}_{2a}$ from $\vec{V}_a$. The way to proceed would be to compare $\vec{V}_{mid/2}$ with $\vec{V}_a$ rather than $\vec{V}_{midb}$ in the algorithm for division.

C. Arithmetic Error Rates

First, the error rates for generating errors are discussed. A stochastic hyperdimensional representation of a number a ∈ [−1,1] is generated using $$\vec{V}_a = \frac{a+1}{2}\vec{V}_1 \oplus \frac{1-a}{2}(\vec{V}_{-1}).$$

Let $X_i$ be a random variable with value 1 if the i-th dimension of $\vec{V}_a$ and $\vec{V}_1$ are the same, and −1 otherwise. Moreover, let $$S = \frac{\sum_i X_i}{D}.$$

Note that $\delta(\vec{V}_a, \vec{V}_1) = 2S - 1$. Now, $X_i$ are independently and identically distributed (i.i.d.) Bernoulli random variable with $$p = \frac{1+a}{2}, \mu = \frac{1+a}{2}, \sigma = \frac{\sqrt{1-a^2}}{2}.$$

Using the central limit theorem, N(0,1) is normal distributed. As a result:

$$\mathbb{P}\left(|\delta(\vec{V}_a, \vec{V}_1) - a| \geq \frac{2\sigma\epsilon}{\sqrt{D}}\right) = \frac{1}{\sqrt{2\pi}}\int_\epsilon^\infty e^{-\frac{x^2}{2}}dx$$

The similarity of two vectors $\vec{V}_a$ and $\vec{V}_b$ is calculated using $$\delta(\vec{V}_a, \vec{V}_b) = \sum_{i=1}^D \frac{\vec{V}_a^i \cdot \vec{V}_b^i}{D},$$

where $\vec{V}_a^i$ is the i-th component of the vector $\vec{V}_a$. The mean absolute error (MRE) of the representation $\vec{V}_a$ is calculated representing the number a ∈ [−1,1] using the formula $$\frac{\mathbb{E}(|\delta(\vec{V}_a, \vec{V}_1) - a|)}{2} \times 100 = \sum_{i=1}^N \frac{|\delta(\vec{V}_{a_i}, \vec{V}_1) - a_i|}{2N} \times 100$$

Here, this is divided by 2 to normalize the length of the interval to 1. This metric is used to compare errors with other methods.

1. Addition/Multiplication

The error in weighted addition follows the same theoretical analysis of the generational error. This is because the analysis only depends on the relation between the probability with which $\vec{V}_a$ and $\vec{V}_1$ have a common dimension, and the value of a itself. The additional advantage is that the repeated weighted addition does not result in an accumulation of error, which is essential in multiplication where weighted addition is used multiple times in a sequence. This arises theoretically from the fact that the distribution of the components of the added vectors follows the correct Bernoulli distribution; thus, the same explained error analysis still holds.

Figures 4A, 4B, 4C:
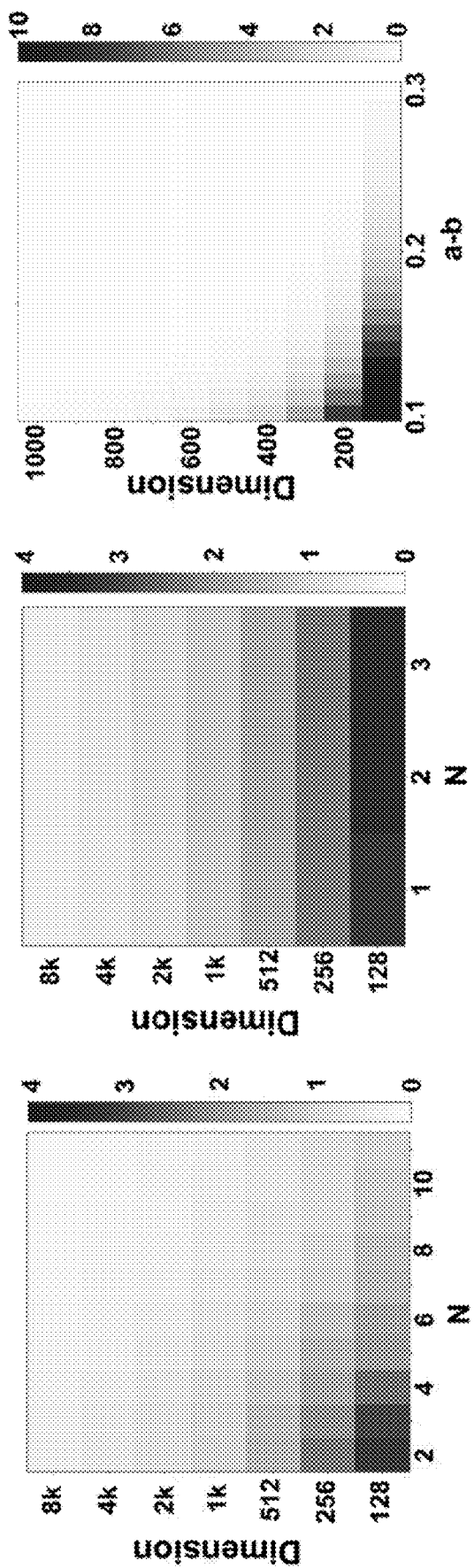
FIG. 4A is a graphical representation of error for the weighted addition of N numbers as a function of the dimension for an embodiment of the stochastic hyperdimensional system.
FIG. 4B is a graphical representation of error for the weighted multiplication of N numbers as a function of the dimension for an embodiment of the stochastic hyperdimensional system.
FIG. 4C is a graphical representation of error for comparison as a function of closeness of a and b and the hypervector dimensions for an embodiment of the stochastic hyperdimensional system.

FIG. 4A is a graphical representation of error for the weighted addition of N numbers as a function of the dimension for an embodiment of the stochastic hyperdimensional system 24. FIG. 4B is a graphical representation of error for the weighted multiplication of N numbers as a function of the dimension for an embodiment of the stochastic hyperdimensional system 24. The results indicate that the larger the N, the lower the error becomes.

2. Comparison/Division

The goal is to find the probability that the comparison returns the correct result. Recall that $$\delta(\vec{V}_{\frac{a-b}{2}}, \vec{V}_1)$$

is normally distributed with $$\mu = \frac{a-b}{2}$$

and standard deviation $$\sigma = \sqrt{1 - \left(\frac{a-b}{2}\right)^2}/\sqrt{D}.$$

Assume $$\sqrt{1 - \left(\frac{a-b}{2}\right)^2} \sim 1$$

which yields the upper bound for the error. The first case is when $$\frac{a-b}{2}$$

is positive. The probability that the comparison returns the incorrect value is given by $$\mathbb{P}\left(\delta(\vec{V}_{\frac{a-b}{2}}, \vec{V}_1) < 0\right) = \sqrt{\frac{D}{2\pi}} \int_{-\infty}^{0} e^{-\frac{D}{2}\left(x - \frac{a-b}{2}\right)^2} dx$$

The second case is when $$\frac{a-b}{2}$$

is negative. The probability that the comparison returns the incorrect value can be computed in a similar way.

FIG. 4C is a graphical representation of error for comparison as a function of closeness of a and b and the hypervector dimensions for an embodiment of the stochastic hyperdimensional system 24. Note that, although comparison has a much higher error rate in D=1024, division does not see any appreciable loss of error.

IV. Processing In-Memory Architecture

This section presents a digital-based processing in-memory architecture implementing StocHD, which accelerates a wide range of HDC-based algorithms on conventional crossbar memory. StocHD supports all essential HDC operations in memory in a parallel and scalable way. FIG. 3B demonstrates an overview of the proposed learning system.

A. StocHD Accelerator

The digital-based PIM architecture enables parallel computing and learning over the hypervectors stored in memory. Unlike prior PIM designs that use large analog-to-digital converter (ADC)/digital-to-analog converter (DAC) blocks for analog computing, StocHD performs all HDC computations on the digital data stored in memory. This eliminates ADC/DAC blocks, resulting in high throughput/area and scalability. StocHD supports several fundamental operations required to accelerate HDC. StocHD uses two blocks for performing the computation: a compute block and a search block.

Figure 5B:
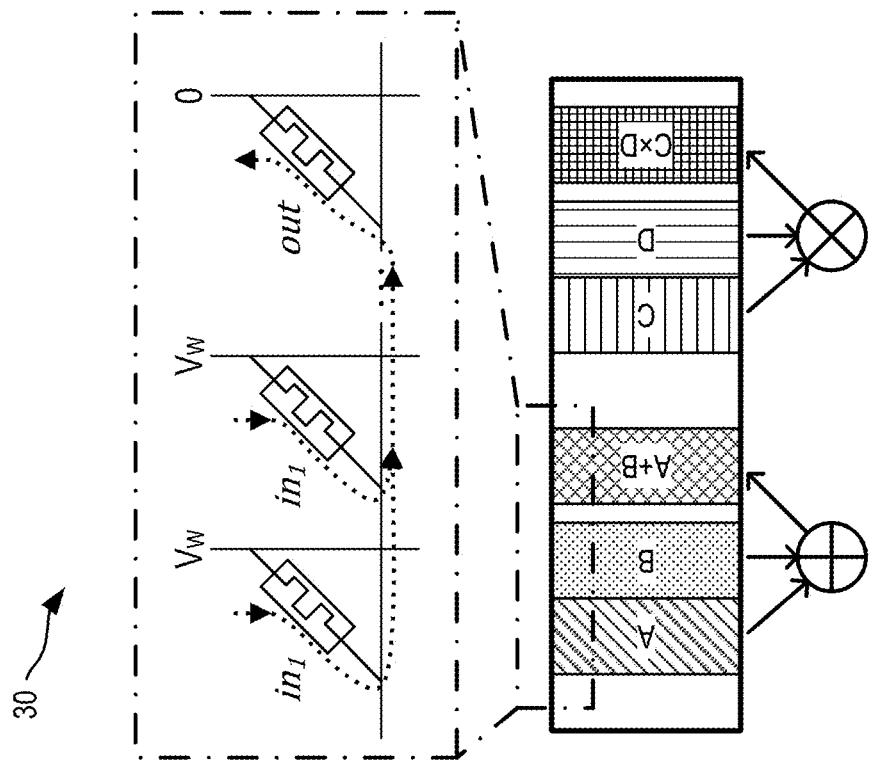
FIG. 5B is a schematic diagram of arithmetic computing on the PIM accelerator.
Figure 5A:
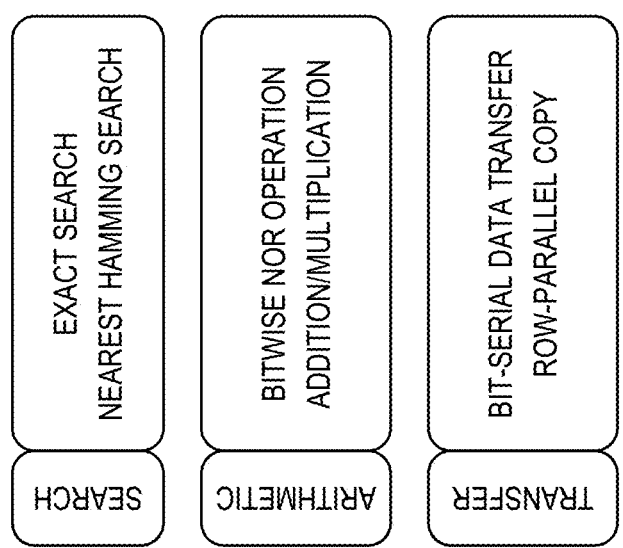
FIG. 5A illustrates supported operations on a PIM accelerator according to embodiments described herein.

FIG. 5A illustrates supported operations on a PIM accelerator 30 according to embodiments described herein. Each block supports the following set of operations: (i) Arithmetic operations: row-parallel NOR-based operation. and (ii) search-based operations: row-parallel nearest Hamming distance search.

1. Row-Parallel PIM-based Arithmetic

Figure 6B:
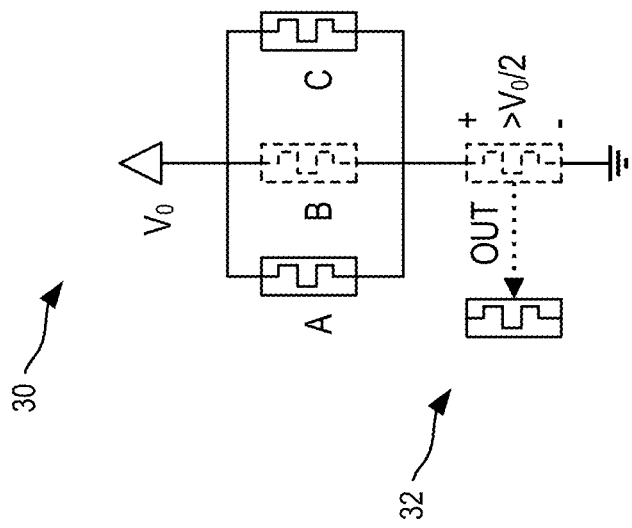
FIG. 6B illustrates an example of the compute block for arithmetic computing on the PIM accelerator with switching.
Figure 6A:
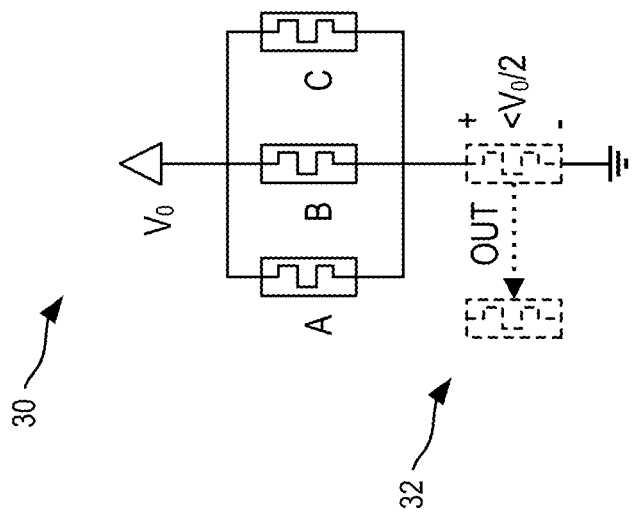
FIG. 6A illustrates an example of a compute block for arithmetic computing on the PIM accelerator without switching.

FIG. 5B is a schematic diagram of arithmetic computing on the PIM accelerator 30. FIG. 6A illustrates an example of a compute block 32 for arithmetic computing on the PIM accelerator 30 without switching. FIG. 6B illustrates an example of the compute block 32 for arithmetic computing on the PIM accelerator 30 with switching. StocHD supports arithmetic operations directly on digital data stored in memory without reading them out of sense amplifiers. This design exploits the memristor switching characteristic to implement NOR gates in digital memory.

StocHD selects two or more columns of the memory as input NOR operands by connecting them to ground voltage. During NOR computation, the output memristor is switched from $R_{ON}$ to $R_{OFF}$ when one or more inputs store a '1' value ($R_{ON}$). In fact, the low resistance input passes a current through an output memristor resulting in writing $R_{OFF}$ value on it. This NOR computation performs in row-parallel on all the activated memory rows by the row-driver. Since NOR is a universal logic gate, it can be used to implement other logic operations like AND and XOR operations required for HDC automatics. For example, embodiments of the PIM accelerator 30 can perform comparison and addition, and may additionally perform at least one of scalar multiplication, vector multiplication, scalar division, vector division, and weighted average. Note that all these arithmetic operations can be supported in parallel over all dimensions of hypervectors, enabling significant computational speedup.

2. Nearest Search

Figure 7:
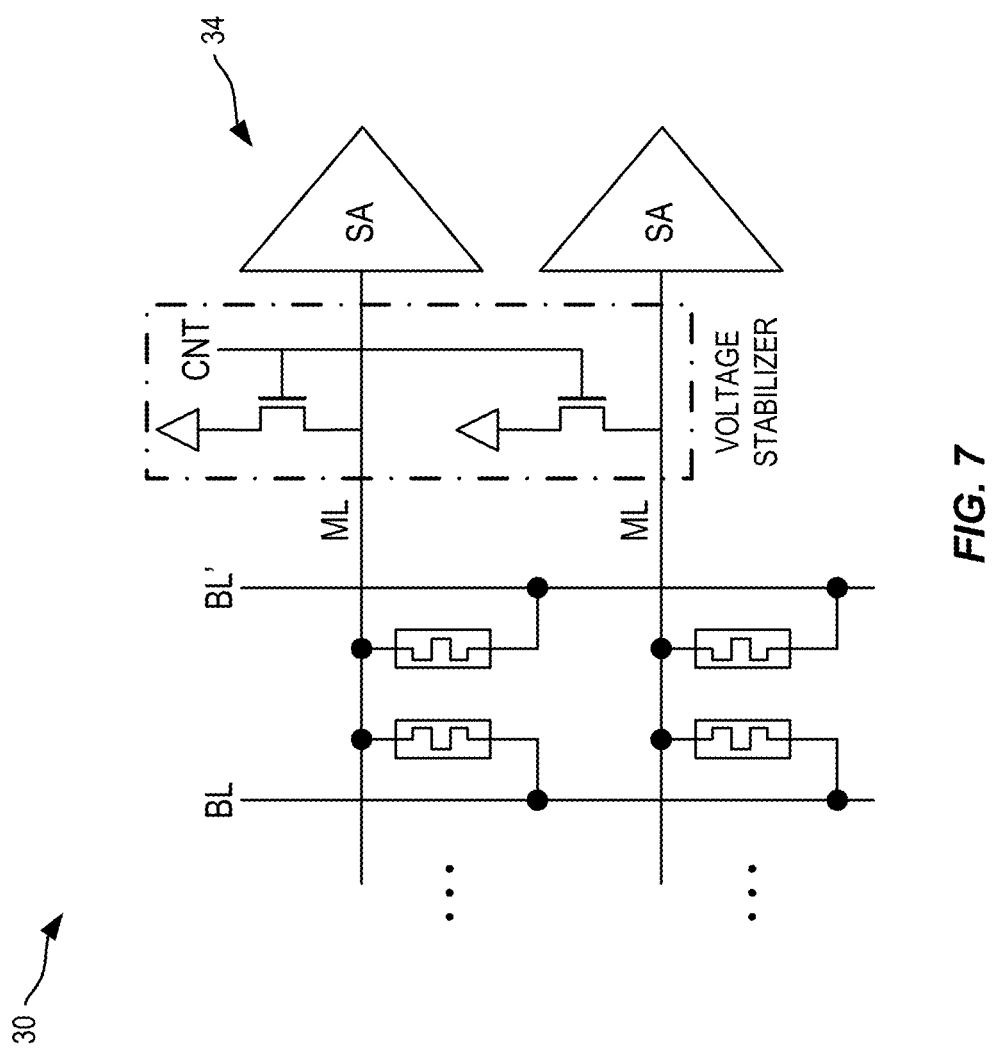
FIG. 7 is a schematic diagram of a search block for content-addressable memory (CAM)-based searching on the PIM accelerator.

FIG. 7 is a schematic diagram of a search block 34 for content-addressable memory (CAM)-based searching on the PIM accelerator 30. The exact search is one of the native operations supported by crossbar memory. During the search, a row-driver of the CAM block pre-charges all CAM rows (match-lines: MLs) to supply voltage ($V_{dd}$). Consider a CAM cell (shown in FIG. 7); if a query input matches with the stored value in the CAM cell, the ML voltage will stay charged. However, in case of a mismatch between the CAM cell and the query data, the CAM starts discharging the ML. Conventionally, CAM blocks exploit the ML discharging current to enable the exact search operation. Here, the timing characteristic of each row discharging current is exploited to detect a row with minimum distance to query data.

Figure 8B:
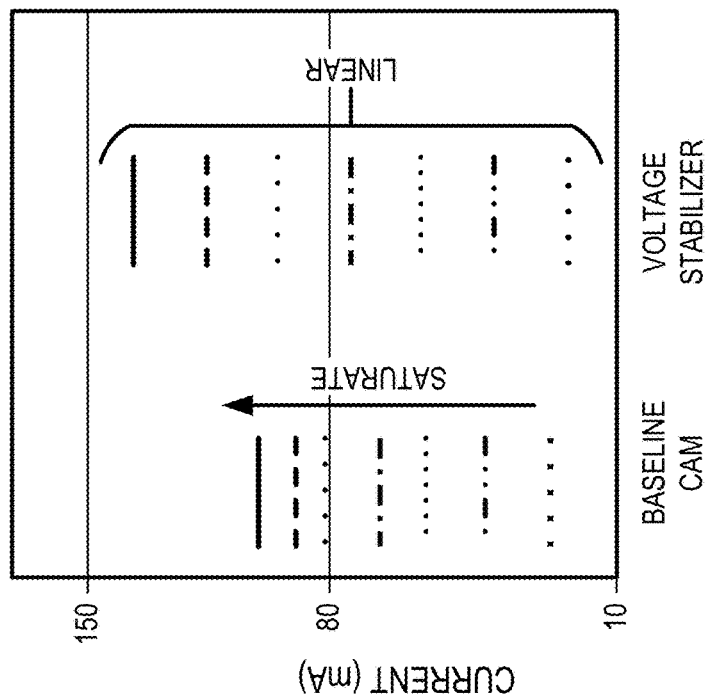
FIG. 8B is a graphical representation of current levels for CAM-based search operations on the PIM accelerator.
Figure 8A:
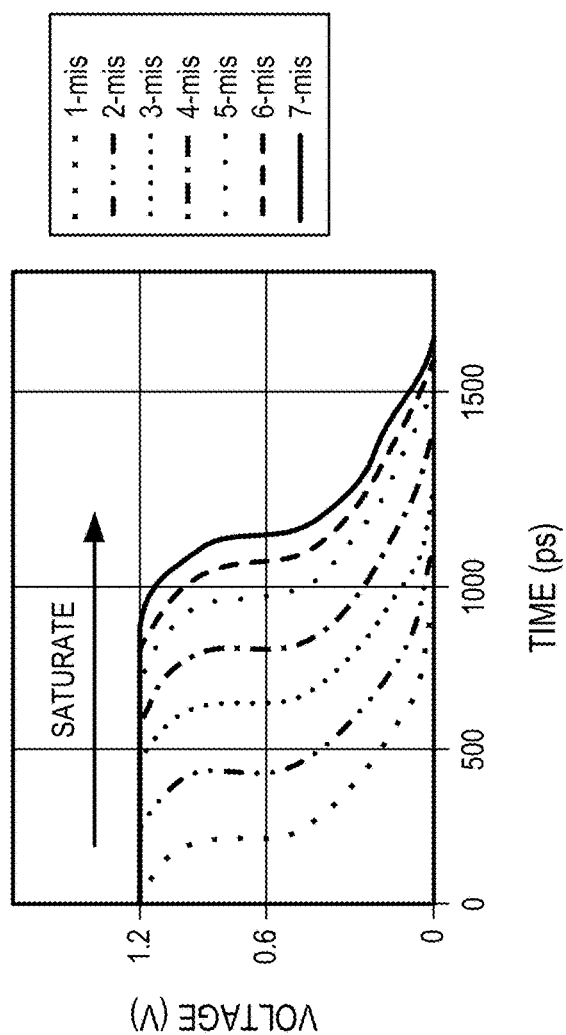
FIG. 8A is a graphical representation of voltage timing for CAM-based search operations on the PIM accelerator.

FIG. 8A is a graphical representation of voltage timing for CAM-based search operations on the PIM accelerator 30. FIG. 8B is a graphical representation of current levels for CAM-based search operations on the PIM accelerator 30. As shown in FIG. 8A, a CAM row with the minimum discharging current will have the highest similarity with the query data. However, due to reducing the voltage of ML during the search, the ML discharging current saturates with increasing the number of mismatches. This eliminates finding a row with minimum Hamming distance.

To provide a more reliable search, a voltage stabilizer is exploited in each CAM row that ensures a fixed ML voltage during the search. In addition, ganged-circuits are used as a CAM sense amplifier to enable the nearest search in a row-parallel way.

B. Architecture

StocHD exploits row-parallel PIM-based NOR operation to accelerate feature extractors, which are mainly based on arithmetic operation, i.e., bitwise operations in HDC space. The feature extraction can perform by simple bitwise operation between hypervectors representing the values. Next, StocHD supports permutation and row-parallel XOR operation over the high-dimensional features. For example, in case of n extracted features, $\{\vec{f}_1, \vec{f}_2, \ldots, \vec{f}_n\}$, StocHD encodes the information by: $\vec{\mathcal{H}} = \vec{f}_1 \oplus \rho^1 \vec{f}_2 \oplus \ldots \rho^{n-1} \vec{f}_n$, where $\rho^n$ denotes n-bit rotational shift. All encoding steps can perform using row-parallel NOR operation and shift operation that can be implemented by the PIM. StocHD performs classification by checking the similarity of an encoded query with a binary HDC class hypervectors. A query will assign to data with the highest Hamming distance similarity. The inference can be supported using the nearest search supported by the PIM.

V. Evaluation

A. Experimental Setup

StocHD is implemented using both software and hardware support. In software, a PyTorch-based library of Hyperdimensional computing is developed, supporting all required computing and learning operations. In hardware, a cycle-accurate simulator is designed based on PyTorch that emulates StocHD functionality during classification. For hardware, HSPICE is used for circuit-level simulations to measure the energy consumption and performance of all the StocHD operations in 28 nanometer (nm) technology. System Verilog and Synopsys Design Compiler are used to implement and synthesize the StocHD controller.

At the circuit-level, the cost of inter-tile communication is simulated, while in architecture, the intra-tile communications are modeled and evaluated. StocHD works with any bipolar resistive technology, which is the most commonly used in existing NVMs. In order to have the highest similarity to commercially available 3D Xpoint, the memristor device is adopted with a VTEAM model. StocHD accuracy and efficiency are evaluated on five popular datasets such as a large data that includes hundreds of thousands of facial data. Table I lists the workloads, their corresponding feature extractors, and dataset size.

TABLE 1

Datasets (n: feature size, k: number of classes)

| | n | k | Feature Extractor | Train Size | Description |
|---|---|---|---|---|---|
| MNIST | 784 | 10 | Convolution | 60,000 | Handwritten Recognition |
| UCIHAR | 561 | 12 | Noise Filter | 6,213 | Activity Recognition (Mobile) |
| ISOLET | 617 | 26 | MFCC | 6,238 | Voice Recognition |
| FACE | 608 | 2 | HOG | 522,441 | Face Recognition |
| PAMAP | 75 | 5 | FFT | 611,142 | Activity Recognition |

B. StocHD Learning Accuracy

1. State-of-the-art Learning Algorithms

Figure 9:
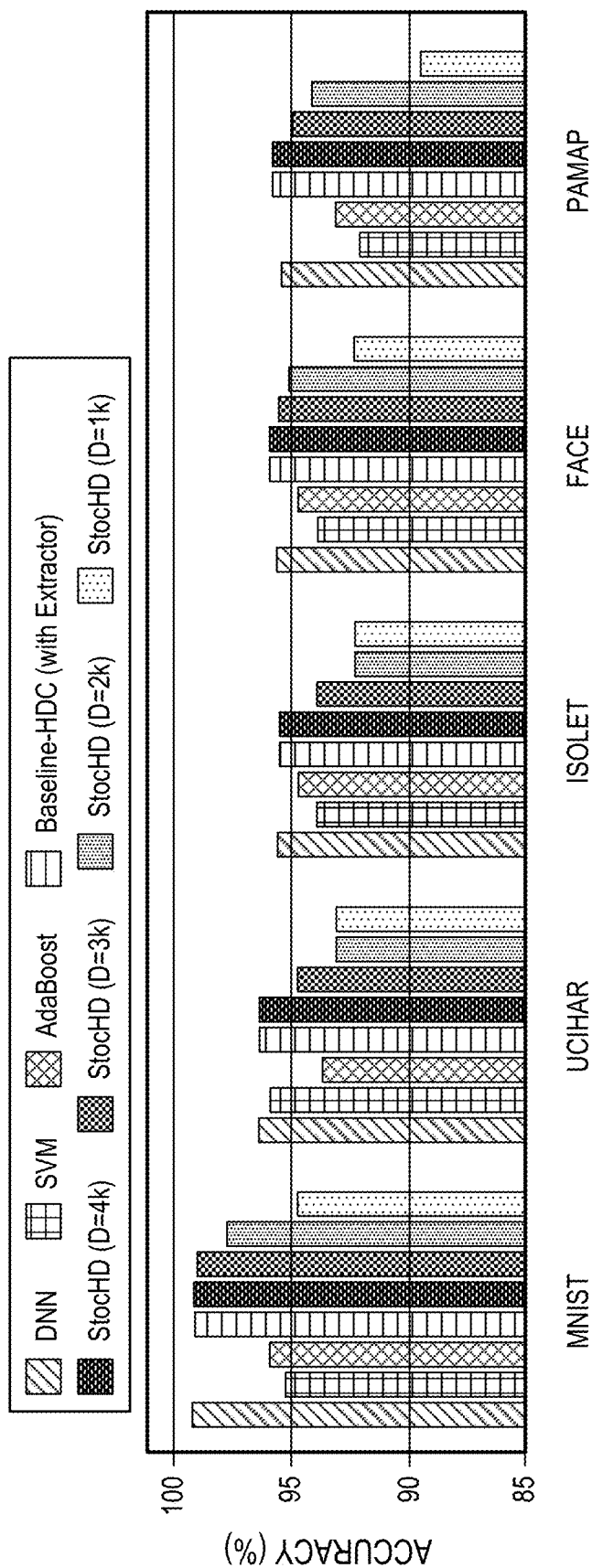
FIG. 9 is a graphical representation comparing the stochastic hyperdimensional system with state-of-the-art approaches.

FIG. 9 is a graphical representation comparing the stochastic hyperdimensional system with state-of-the-art approaches. StocHD classification accuracy is compared with state-of-the-art learning algorithms, including deep neural networks (DNNs), support vector machine (SVM), and AdaBoost. The DNN models are trained with Tensorflow, and the Scikit-learn library is exploited to train other machine learning algorithms. The grid search is exploited to identify the best hyper-parameters for each model. The evaluation shows that StocHD provides comparable accuracy to other state-of-the-art algorithms (only 0.2% lower than DNN, and 1.5% and 1.8% higher than SVM and AdaBoost).

2. Baseline HDC Algorithms

HDC classification accuracy is compared in different configurations: (i) without feature extractor where learning directly happens over a raw data, (ii) with feature extractor running on original data, and (iii) using StocHD arithmetic computation to processed feature extraction. The evaluation shows that HDC with no feature extraction provides, on average, 59% lower accuracy than HDC operating over extracted features. Revisiting the feature extractor with StocHD stochastic arithmetic can almost provide the same result as running feature extraction over original data. The quality of StocHD computation depends on the HDC dimensionality. Using D=4,000 dimensions, StocHD provides the same accuracy as the baseline algorithm. Reducing dimension to D=3,000 and D=2,000 reduces StocHD accuracy, on average, by 0.9% and 2.1%, respectively. This lower accuracy comes from StocHD accumulative noise during the pre-processing step.

C. StocHD Learning Efficiency

1. PIM & Feature Extraction

FIG. 10A is a graphical representation of speedup of the stochastic hyperdimensional system. FIG. 10B is a graphical representation of energy efficiency of the stochastic hyperdimensional system. All results are normalized to execution time and energy consumption of the baseline HDC running on NVIDIA GTX 1080 GPU. In GPU, the feature extraction takes, on average, 72% of execution time and 77% of total learning energy consumption. As explained in Section IV, the proposed PIM accelerator 30 is an in-memory computing platform that can accelerate any tensor-based algorithms, including the feature extractors, listed in Table I. To accelerate feature exaction, PIM exploits high-precision arithmetic computation, such as addition and multiplication, that operates over original data representation. However, PIM is sequential and slow in supporting the high-precision arithmetic over traditional data. For example, for N-bit addition and multiplication, PIM requires $13N+1$ and $13N^2+16N+1$ NOR cycles, respectively. This makes this PIM platform less ideal to operate over traditional data, e.g., fixed point or floating-point representation.

2. StocHD Feature Extraction

Figure 11:
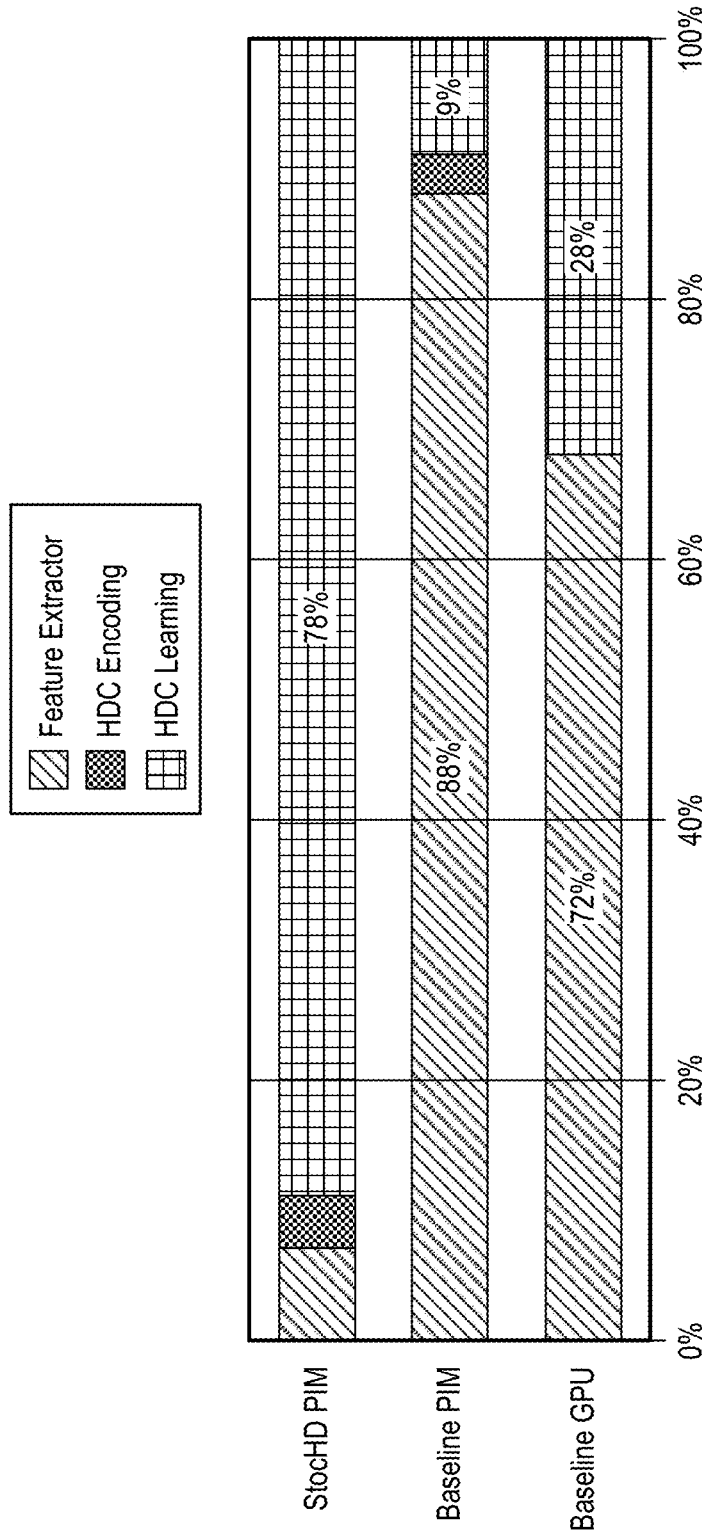
FIG. 11 is a graphical representation comparing a breakdown of execution time in the baseline HDC and StocHD running on GPU and PIM platform.

FIG. 11 is a graphical representation comparing a breakdown of execution time in the baseline HDC and StocHD running on GPU and PIM platform. The evaluation shows that the slowness of the PIM to support high-precision arithmetic further increases a portion that feature extractor from the total execution time (88% over all tested applications). In contrast, StocHD is an end-to-end HDC-based platform that speeds up the feature extraction by simplifying the arithmetic operation to highly parallel bitwise operations. The HDC arithmetic are extensively parallel and PIM friendly. For example, unlike multiplication in original space that performs bit-sequentially, PIM can implement StocHD stochastic multiplication with two AND operations over hypervectors. The evaluation shows that StocHD using D=4,000 provides 3.3× and 6.4× (52.3× and 143.5×) faster and higher energy efficiency as compared to baseline HDC running on the same PIM (GPU) platform.

3. Breakdown

The evaluation on FIG. 11 shows that StocHD not only reduces the cost of feature extractor but also diminishes the cost of the encoding module. In baseline HDC, the encoding requires an extra step for feature quantization and non-linear data mapping. In contrast, in StocHD, features are already in high-dimensional space. Therefore, a linear HDC encoding can aggregate the high-dimensional features extracted by the pre-processing method. The evaluation shows that StocHD reduces the performance overhead of the feature extractor and encoding to less than 7% and 4%, respectively.

4. Dimensionality

Reducing the dimensionality improves StocHD computation efficiency. As FIGS. 10A and 10B show, StocHD using D=2,000 dimensions provides, on average, 4.2× and 8.1× (67.0× and 183.9×) faster and higher energy efficiency as compared to the baseline HDC running on PIM (GPU).

D. StocHD Robustness

Many advanced technologies typically pose issues for hardware robustness. One of the main advantages of StocHD is its high robustness to noise and failure in hardware. In StocHD, hypervectors are random and holographic with i.i.d. components. Each hypervector stores all the information across all its components so that no component is more responsible for storing any piece of information than another. This makes a hypervector robust against errors in its components. StocHD efficiency and robustness highly depend on the dimensionality and the precision of each hypervector element. Table II compares StocHD robustness to noise in the memory devices. StocHD provides significantly higher robustness to memory noise than the baseline HDC algorithm. In binary representation, an error only flips a reference dimension results in minor changes in the entire hypervector pattern. In contrast, an error in original space (feature extractor in baseline HDC) can happen in most significant bits, which significantly affects the absolute value and robustness. The results indicate that 10% failure in memory cells results in 0.9% and 14.4% loss on StocHD and the baseline HDC accuracy.

TABLE II

| Quality loss using noisy and low endurance | | | | | |
|---|---|---|---|---|---|
| Memory Error | 1% | 2% | 5% | 10% | 15% |
| Baseline HDC | 1.1% | 4.5% | 9.3% | 14.4% | 27.3% |
| StocHD (D = 4 k) | 0.0% | 0.0% | 0.3% | 0.9% | 2.1% |
| StocHD (D = 1 k) | 0.0% | 0.2% | 0.8% | 1.8% | 3.4% |
| Endurance Years | 1 | 2 | 3 | 4 | 5 |
| Baseline HDC | 0% | 1.7% | 4.1% | 11.5% | 24.5% |
| StocHD (D = 4 k) | 0% | 0.5% | 0.9% | 1.8% | 2.4% |
| StocHD (D = 1 k) | 0.0% | 0.8% | 1.6% | 3.3% | 5.2% |

Table II also explores the impact of limited NVM endurance on StocHD quality of learning. Assume an endurance model with $\mu=10^7$. The evaluation shows that after a few years of using the PIM-based platform, similar to the human brain, StocHD starts forgetting information stored in reference hypervector. To address this issue, wear-leveling is performed to distribute writes uniformly over memory blocks. The overhead of wear-leveling is minor as (i) StocHD has predictable write pattern, and (ii) wear-leveling can happen in long-time periods. The evaluation shows that the baseline HDC has higher sensitivity to the endurance issue. This is because feature extractor requires PIM arithmetic operation that involves several device switching. In contrast, StocHD computes feature extraction with minimal write operation.

VI. Process for Efficient and Robust Computation

Figure 12:
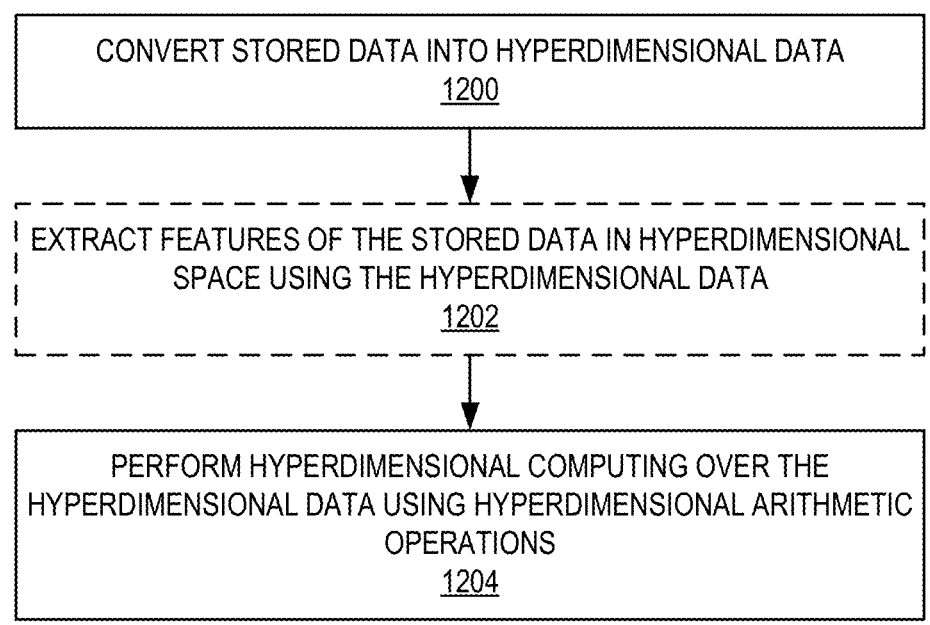
FIG. 12 is a flow diagram illustrating a process for efficient and robust computation.

FIG. 12 is a flow diagram illustrating a process for efficient and robust computation. Dashed boxes represent optional steps. The process begins at operation 1200, with converting stored data into hyperdimensional data. In an exemplary aspect, converting the stored data into the hyperdimensional data comprises generating a set of hypervectors representing the stored data. The process optionally continues at operation 1202, with extracting features of the stored data in hyperdimensional space using the hyperdimensional data. The process continues at operation 1204, with performing hyperdimensional computation over the hyperdimensional data using hyperdimensional arithmetic operations. In an exemplary aspect, the hyperdimensional arithmetic operations include one or more of comparison, addition, subtraction, multiplication, division, weighted average, and doubling.

Although the operations of FIG. 12 are illustrated in a series, this is for illustrative purposes and the operations are not necessarily order dependent. Some operations may be performed in a different order than that presented. Further, processes within the scope of this disclosure may include fewer or more steps than those illustrated in FIG. 12.

VII. Computer System

Figure 13:
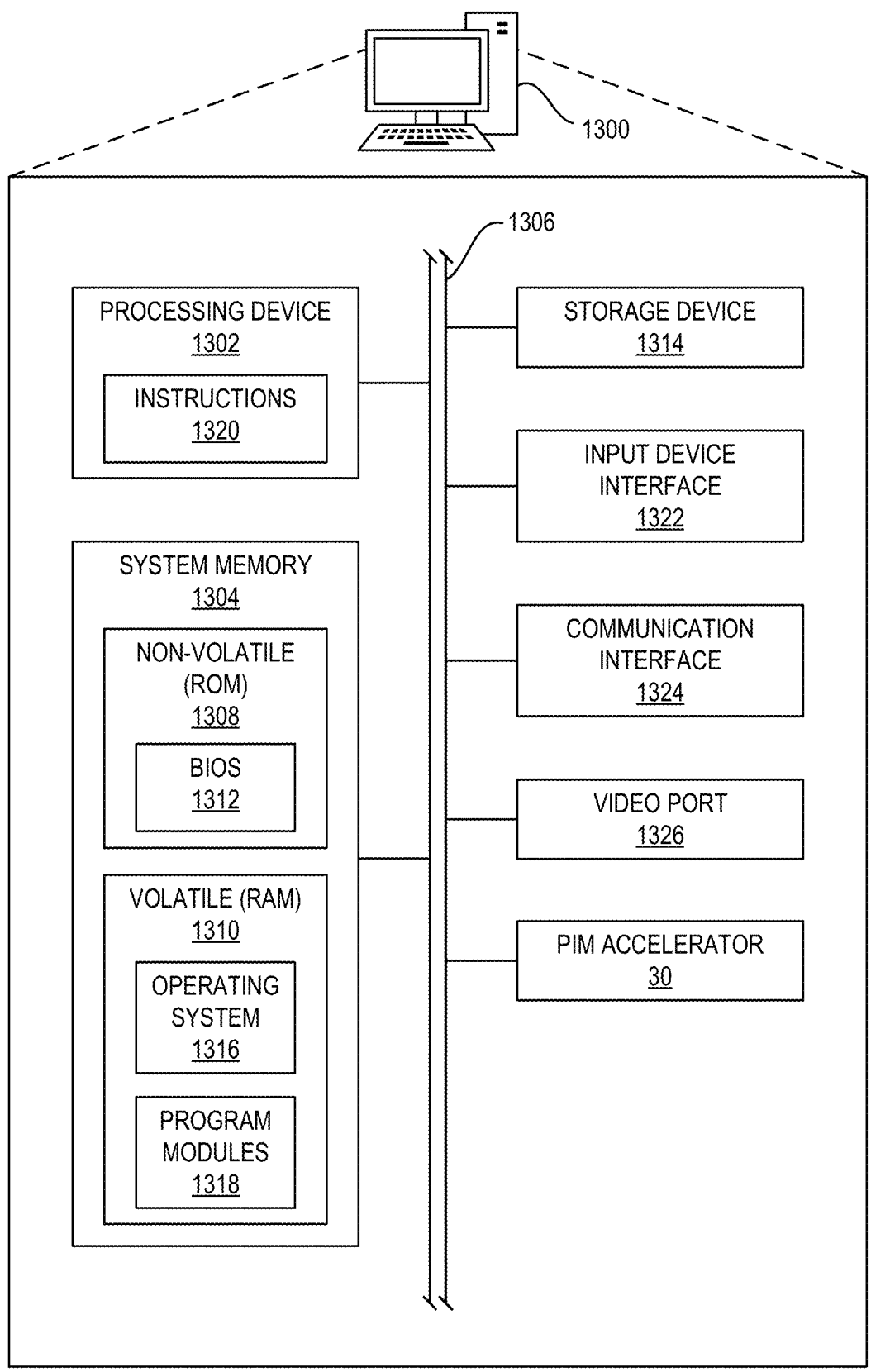
FIG. 13 is a block diagram of a computer system incorporating the PIM accelerator according to embodiments disclosed herein.

FIG. 13 is a block diagram of a computer system 1300 incorporating the PIM accelerator 30 according to embodiments disclosed herein. The computer system 1300 comprises any computing or electronic device capable of including firmware, hardware, and/or executing software instructions that could be used to perform any of the methods or functions described above, such as hyperdimensional computation. In this regard, the computer system 1300 may be a circuit or circuits included in an electronic board card, such as a printed circuit board (PCB), a server, a personal computer, a desktop computer, a laptop computer, an array of computers, a personal digital assistant (PDA), a computing pad, a mobile device, or any other device, and may represent, for example, a server or a user's computer.

The exemplary computer system 1300 in this embodiment includes a processing device 1302 or processor, a system memory 1304, and a system bus 1306. The processing device 1302 represents one or more commercially available or proprietary general-purpose processing devices, such as a microprocessor, central processing unit (CPU), or the like. More particularly, the processing device 1302 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processing device 1302 is configured to execute processing logic instructions for performing the operations and steps discussed herein.

In this regard, the various illustrative logical blocks, modules, and circuits described in connection with the embodiments disclosed herein may be implemented or performed with the processing device 1302, which may be a microprocessor, field programmable gate array (FPGA), a digital signal processor (DSP), an application-specific integrated circuit (ASIC), or other programmable logic device, a discrete gate or transistor logic, discrete hardware components, or any combination thereof designed to perform the functions described herein. Furthermore, the processing device 1302 may be a microprocessor, or may be any conventional processor, controller, microcontroller, or state machine. The processing device 1302 may also be implemented as a combination of computing devices (e.g., a combination of a DSP and a microprocessor, a plurality of microprocessors, one or more microprocessors in conjunction with a DSP core, or any other such configuration).

The system memory 1304 may include non-volatile memory 1308 and volatile memory 1310. The non-volatile memory 1308 may include read-only memory (ROM), erasable programmable read-only memory (EPROM), electrically erasable programmable read-only memory (EEPROM), and the like. The volatile memory 1310 generally includes random-access memory (RAM) (e.g., dynamic random-access memory (DRAM), such as synchronous DRAM (SDRAM)). A basic input/output system (BIOS) 1312 may be stored in the non-volatile memory 1308 and can include the basic routines that help to transfer information between elements within the computer system 1300.

The system bus 1306 provides an interface for system components including, but not limited to, the system memory 1304 and the processing device 1302. The system bus 1306 may be any of several types of bus structures that may further interconnect to a memory bus (with or without a memory controller), a peripheral bus, and/or a local bus using any of a variety of commercially available bus architectures.

The computer system 1300 may further include or be coupled to a non-transitory computer-readable storage medium, such as a storage device 1314, which may represent an internal or external hard disk drive (HDD), flash memory, or the like. The storage device 1314 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as optical disks, magnetic cassettes, flash memory cards, cartridges, and the like, may also be used in the operating environment, and, further, that any such media may contain computer-executable instructions for performing novel methods of the disclosed embodiments.

An operating system 1316 and any number of program modules 1318 or other applications can be stored in the volatile memory 1310, wherein the program modules 1318 represent a wide array of computer-executable instructions corresponding to programs, applications, functions, and the like that may implement the functionality described herein in whole or in part, such as through instructions 1320 on the processing device 1302. The program modules 1318 may also reside on the storage mechanism provided by the storage device 1314. As such, all or a portion of the functionality described herein may be implemented as a computer program product stored on a transitory or non-transitory computer-usable or computer-readable storage medium, such as the storage device 1314, volatile memory 1310, non-volatile memory 1308, instructions 1320, and the like. The computer program product includes complex programming instructions, such as complex computer-readable program code, to cause the processing device 1302 to carry out the steps necessary to implement the functions described herein.

An operator, such as the user, may also be able to enter one or more configuration commands to the computer system 1300 through a keyboard, a pointing device such as a mouse, or a touch-sensitive surface, such as the display device, via an input device interface 1322 or remotely through a web interface, terminal program, or the like via a communication interface 1324. The communication interface 1324 may be wired or wireless and facilitate communications with any number of devices via a communications network in a direct or indirect fashion. An output device, such as a display device, can be coupled to the system bus 1306 and driven by a video port 1326. Additional inputs and outputs to the computer system 1300 may be provided through the system bus 1306 as appropriate to implement embodiments described herein.

The operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined.

Those skilled in the art will recognize improvements and modifications to the preferred embodiments of the present disclosure. All such improvements and modifications are considered within the scope of the concepts disclosed herein and the claims that follow.

What is claimed is:

1. A method for efficient and robust computation, comprising:
   converting stored data into hyperdimensional data;
   storing the hyperdimensional data in a processing-in-memory (PIM) accelerator; and
   performing hyperdimensional computing over the hyperdimensional data using hyperdimensional arithmetic operations, wherein the performing hyperdimensional computing comprises performing a row-parallel nor-based arithmetic operation on a set of hypervectors of the hyperdimensional data.

2. The method of claim 1, wherein converting the stored data into the hyperdimensional data comprises generating the set of hypervectors representing the stored data.

3. The method of claim 1, wherein the hyperdimensional arithmetic operations comprise comparison and addition.

4. The method of claim 3, wherein the hyperdimensional arithmetic operations further comprise at least one of scalar multiplication, vector multiplication, scalar division, vector division, and weighted average.

5. The method of claim 1, wherein performing the hyperdimensional computing comprises performing parallel hyperdimensional arithmetic operations in-memory.

6. The method of claim 1, further comprising extracting features of the stored data in hyperdimensional space using the hyperdimensional data.

7. The method of claim 6, wherein extracting features of the stored data comprises performing row-parallel arithmetic operations of the hyperdimensional data.

8. A processing-in-memory (PIM) accelerator, comprising:
   a memory array of the PIM accelerator configured to store hyperdimensional data comprising a set of hypervectors; and
   a compute block coupled to the memory array and configured to perform hyperdimensional arithmetic operations on the set of hypervectors, wherein the compute block is configured to perform a row-parallel nor-based arithmetic operation on the set of hypervectors.

9. The PIM accelerator of claim 8, wherein the memory array comprises an array of memristors.

10. The PIM accelerator of claim 9, wherein the compute block is configured to implement the nor-based arithmetic operation using switching characteristics of the array of memristors.

11. The PIM accelerator of claim 10, wherein the compute block comprises a plurality of output memristors switchably coupled to the array of memristors to digitally implement a plurality of distinct nor-based arithmetic operations.

12. The PIM accelerator of claim 8, further comprising a search block coupled to the memory array and configured to perform search operations on the set of hypervectors.

13. The PIM accelerator of claim 12, wherein:
the memory array comprises an array of memristors; and
the search block is configured to perform the search operations based on timing characteristics of the array of memristors.

14. A stochastic hyperdimensional system, comprising:
a processing-in-memory (PIM) accelerator; and
a system memory storing instructions which when executed cause the PIM accelerator to:
convert data stored in memory into a set of hypervectors stored in the PIM accelerator; and
perform a hyperdimensional computation over the set of hypervectors using hyperdimensional arithmetic operations, wherein performing the hyperdimensional computation comprises performing a row-parallel nor-based arithmetic operation on the set of hypervectors.

15. The stochastic hyperdimensional system of claim 14, wherein the PIM accelerator is configured to perform the hyperdimensional arithmetic operations on the set of hypervectors without using sense amplifiers.

16. The stochastic hyperdimensional system of claim 14, wherein the PIM accelerator is configured to perform hyperdimensional arithmetic operations comprising at least comparison and addition on the set of hypervectors.

17. The stochastic hyperdimensional system of claim 16, wherein the PIM accelerator is further configured to perform at least one of multiplication, division, and weighted average on the set of hypervectors.

18. The stochastic hyperdimensional system of claim 14, wherein the PIM accelerator comprises:
a compute block coupled to a memory array and configured to perform hyperdimensional arithmetic operations on the memory array; and
a search block coupled to the memory array and configured to perform search operations on the memory array.

19. The stochastic hyperdimensional system of claim 18, wherein:
the compute block is configured to perform the row-parallel nor-based arithmetic operation on the memory array; and
the search block is configured to perform a row-parallel nearest hamming distance search on the memory array.

\* \* \* \* \*

UNITED STATES PATENT AND TRADEMARK OFFICE
CERTIFICATE OF CORRECTION

PATENT NO. : 12,204,899 B2
APPLICATION NO. : 17/744371
DATED : January 21, 2025
INVENTOR(S) : Mohsen Imani Page 1 of 1

It is certified that error appears in the above-identified patent and that said Letters Patent is hereby corrected as shown below:

In the Specification

In Column 7, Line 56, replace "i-tn" with --i-th--.

In Column 8, Line 50, replace "probibilities" with --probabilities--.

Signed and Sealed this
Thirteenth Day of May, 2025

Coke Morgan Stewart
*Acting Director of the United States Patent and Trademark Office*